United States Patent [19]
El-Kassouf

[11] Patent Number: 5,971,413
[45] Date of Patent: Oct. 26, 1999

[54] TRUNNION MOUNT

[75] Inventor: Raji Said El-Kassouf, Southfield, Mich.

[73] Assignee: Meritor Heavy Vehicle Systems, LLC, Troy, Mich.

[21] Appl. No.: 08/933,300

[22] Filed: Sep. 18, 1997

[51] Int. Cl.[6] .................................................. B60G 9/02
[52] U.S. Cl. .............................. 280/124.111; 180/360; 74/606 R; 74/607; 384/276
[58] Field of Search ............ 280/124.11, 124.111; 180/348, 354, 360, 378, 374, 375; 301/137, 125; 74/606 R, 607; 248/659, 666; 384/276, 296

[56]  References Cited

U.S. PATENT DOCUMENTS

| Re. 32,774 | 11/1988 | Duff | 280/673 |
|---|---|---|---|
| 2,112,628 | 3/1938 | Lee | 180/354 |
| 3,473,821 | 10/1969 | Barenyi et al. | 280/124.111 |
| 3,632,128 | 1/1972 | Raidel | 280/104.5 R |
| 3,811,699 | 5/1974 | Casey | 280/111 |
| 3,977,700 | 8/1976 | Leaf | 280/685 |
| 4,085,682 | 4/1978 | Nelson et al. | 105/157 R |
| 4,174,871 | 11/1979 | Brannan | 308/238 |
| 4,193,612 | 3/1980 | Masser | 280/681 |
| 4,202,564 | 5/1980 | Strader | 280/678 |
| 4,408,775 | 10/1983 | Hildebrecht | 280/95 R |
| 4,497,504 | 2/1985 | Duff | 280/673 |
| 4,565,390 | 1/1986 | Merkle | 280/726 |
| 4,699,230 | 10/1987 | Solleder et al. | 180/360 |
| 4,703,915 | 11/1987 | King | 251/328 |
| 5,186,485 | 2/1993 | Orr et al. | 280/678 |
| 5,732,441 | 3/1998 | Janian | 384/276 |

FOREIGN PATENT DOCUMENTS

| 0304976 | 7/1988 | European Pat. Off. |
| 0391209 | 3/1990 | European Pat. Off. |
| 62-278370 | 12/1987 | Japan. |
| 1-226410 | 9/1989 | Japan. |

*Primary Examiner*—Paul N. Dickson
*Attorney, Agent, or Firm*—Howard & Howard

[57]  ABSTRACT

A unique trunnion mount for an axle assembly allows the axle to pivot about a longitudinal axis of a vehicle. The trunnion mount is comprised of two separate mounts, each of which is supported by an axle housing. The first mount is supported by the bearing cage on the input side of the axle housing. The second mount is attached to the opposite side of the axle housing and is comprised of a V-shaped bushing which presents angular exterior bearing surfaces which rotatably support the vehicle frame.

20 Claims, 2 Drawing Sheets

TRUNNION MOUNT

BACKGROUND OF THE INVENTION

This invention relates to a unique trunnion mount for an axle assembly which allows the axle to pivot about a longitudinal axis of a vehicle.

A typical axle assembly includes first and second driven wheels which are rotated by a driveshaft through a main differential. The axle assembly includes an axle housing which encloses the main differential and extends along a central axis between the driven wheels. The axle can be mounted to a vehicle frame by various methods. Some axle housings include spring pads or other mounting pads, located on a top surface of the axle housing between the main differential and the driven wheels. Brackets, springs, and other suspension components are attached to the axle housing via these mounting pads for supporting the vehicle frame on the axle.

Other axles utilize a trunnion mount for mounting the axle assembly to a vehicle frame. A typical trunnion mount includes first and second mounts disposed on longitudinally opposite sides of the central axis near the main differential for supporting the axle housing on the vehicle. An axle with a trunnion mount allows rotation about a longitudinal axis of the vehicle.

Current trunnion mounts use bearings for the first and second mounts. Usually, the first mount is supported by tapered roller bearings mounted on the pinion bearing cage located near the input shaft to the main differential while the second mount, attached to the opposite side of the main differential, is a tapered roller bearing or a straight cylindrical bushing which supports a vehicle frame bracket. These bearings react to both radial and axial forces that occur during the operation of the vehicle as a result of the duty cycle and vehicle loading. Over time, these forces cause the bearings to wear and eventually they need to be replaced. These bearings are expensive and require regular maintenance.

It would be desirable to reduce the axial and radial loading on the bearings so that longer component life can be achieved. It would also be desirable to replace the tapered roller bearing with a less expensive component. Thus, there is a need for a trunnion mount comprised of components with a long service life and which are inexpensive and easily maintained.

SUMMARY OF THE INVENTION

The subject invention relates to a unique trunnion mount for connecting an axle assembly to a vehicle frame and which allows the axle to pivot about a longitudinal axis of a vehicle. The trunnion mount is comprised of two separate mounts, each of which is supported by an axle housing. Thus, each mount represents an interconnection between the axle assembly and the vehicle frame. The first mount is supported by a bearing cage on the input side of the axle housing. The second mount is on the opposite side of the axle housing and has a V-shaped bushing which presents angular exterior bearing surfaces to rotatably support the vehicle frame. The first mount reacts only to radial forces while the second mount reacts to both axial and radial forces occurring during operation of the vehicle.

The inventive mount is preferably utilized in an axle assembly for a vehicle having first and second mount interfaces. The first mount interface includes a first bracket assembly extending downwardly from the vehicle frame. The first bracket assembly is rotatably supported on the bearing cage on the input side of the axle housing, thus comprising the first mount, i.e. the first interconnection between the axle assembly and the vehicle frame. The second mount interface includes a second bracket assembly extending downwardly from the vehicle frame. The second bracket assembly is supported on the V-shaped bushing located on the axle housing opposite from the bearing cage, thus comprising the second mount, i.e. the second interconnection between the axle assembly and the vehicle frame. The V-shaped bushing of the second mount presents a bearing surface for sliding engagement with an opposing bearing surface on the second bracket assembly. The bearing surface of the V-shaped bushing has two surfaces that are disposed at a angular relationship to a central bushing axis.

The invention offers several advantages over prior art trunnion mounts because it decreases the loading on the front mount resulting in longer component life and decreases the overall cost by eliminating the expensive tapered roller bearing for the first or second mount by replacing it with a unique V-shaped bushing.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
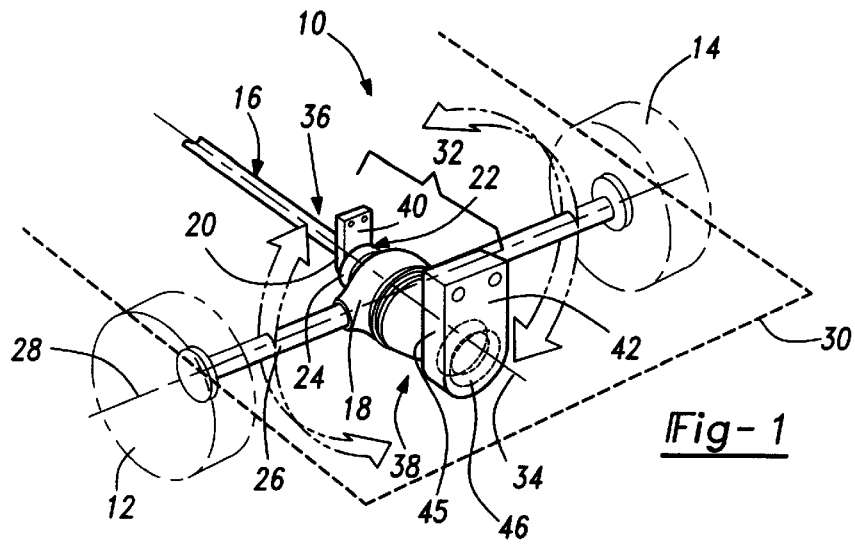
FIG. 1 is a perspective view of an axle assembly utilizing the subject invention.

A typical axle assembly 10, shown in FIG. 1, includes first 12 and second 14 driven wheels which are rotated by a driveshaft 16 through a main differential 18. The driveshaft 16 enters an input side 20 of the main differential 18 and is supported on a bearing 22. The bearing 22 is well known in the art and is comprised of an inner race, an outer race, rolling elements, and a bearing cage 24. The axle assembly 10 includes an axle housing 26 which encloses the main differential 18 and extends along a central axis 28 between the driven wheels 12, 14. The axle 10 is mounted to a vehicle 30 by a trunnion mount, shown generally at 32, which allows the axle 10 to rotate or pivot about a longitudinal axis 34 of the vehicle 30 disposed transversely to the central axis 28 of the axle housing 26, as shown by the arrows in FIG. 1.

Trunnion mount 32 is comprised of two separate mounts for supporting axle assembly 10 on vehicle 30, a first mount 36 and a second mount 38, each supported by the axle housing 26 and which are disposed on longitudinally opposite sides of the central axis 28. Thus, each mount 36, 38 represents an interconnection between the axle assembly 10 and the vehicle frame.

Trunnion mount 32 is preferably used with a vehicle 30 having first 40 and second 42 mount interfaces. The first mount interface 40 includes a first bracket assembly 44 extending downwardly from the vehicle frame. The first bracket assembly 44 is rotatably supported on the bearing cage 24 on the input side 20 of the axle housing 26, thus comprising the first mount 36, i.e., the first interconnection between the axle assembly 10 and the vehicle frame. The second mount interface 42 includes a second bracket assembly 45 extending downwardly from the vehicle frame. The second bracket assembly 45 is supported on a V-shaped bushing 46 located on the axle housing 26 opposite from the bearing cage 24, thus comprising the second mount 38, i.e. the second interconnection between the axle assembly 10 and the vehicle frame. The first mount 36 reacts only to radial forces, while the second mount 38 reacts to both axial and radial forces that occur during the operation of the vehicle 30 as a result of the vehicle's duty cycle and vehicle loading.

Figure 2:
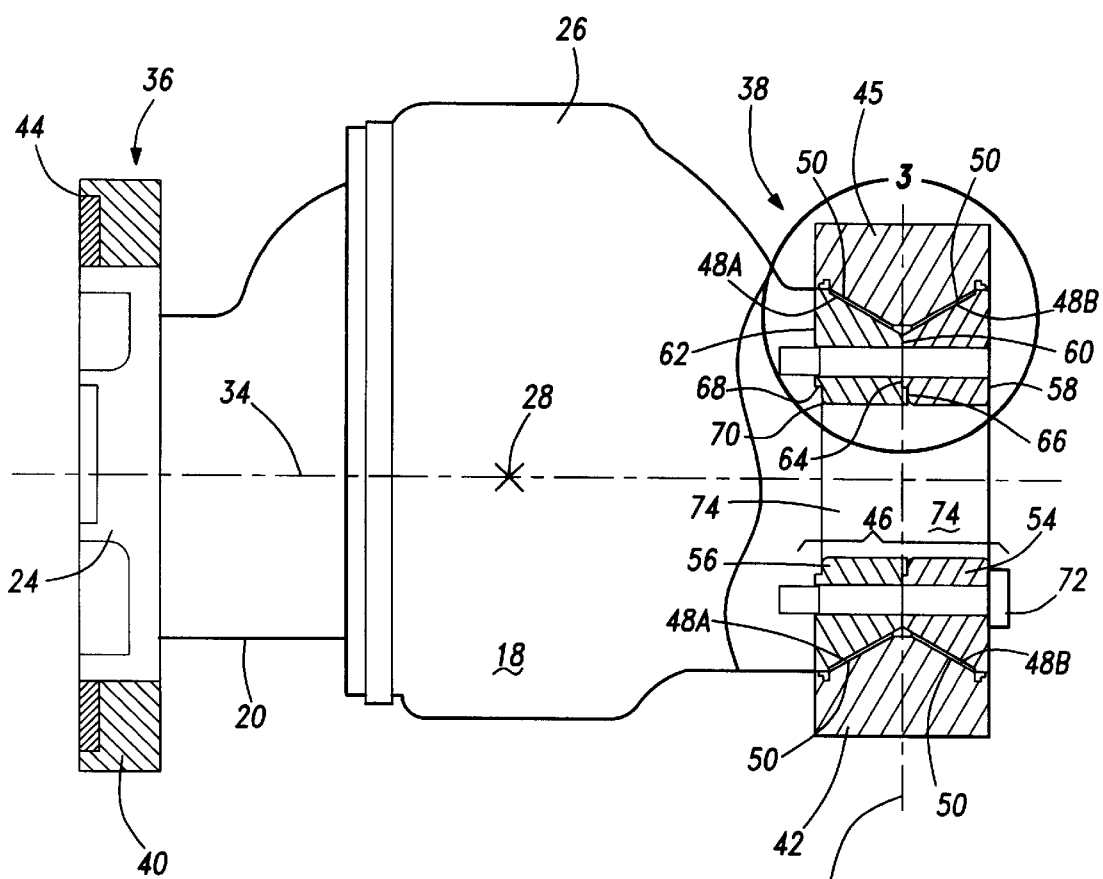
FIG. 2 is a side view of the axle assembly of FIG. 1 showing the subject invention in cross-section.

As shown in FIG. 2, the V-shaped bushing 46 of the second mount 38 presents a bearing surface 48 (48A and 48B) for sliding engagement with an opposing bearing surface 50 on the second bracket assembly 45. Either or both of the bearing surfaces 48, 50 can be sliding surfaces. The bearing surface 48 of the V-shaped bushing 46 is comprised of two surfaces 48A, 48B that are disposed at a angular relationship to a central bushing axis 52 which represents the centerline of the bushing 46. The bearing surfaces 48A, 48B originate at an apex located on the central bushing axis 52 and extend radially outwardly from opposite sides of the central bushing axis 52, thus forming a V-shape. It should be understood that the angular relationship between bearing surface 48A and the central bushing axis 52 can be of any various angles between zero and ninety degrees, as can the angular relationship between bearing surface 48B and the central bushing axis 52. While the angle between bearing surface 48A and the central bushing axis 52 is preferably identical to the angle between bearing surface 48B and the central bushing axis 52, the invention is not limited to this embodiment. Thus, it is possible for the angles between the bearing surfaces 48A and 48B and the central bushing axis 52 to be different from each other.

While the bushing 46 of the preferred embodiment is comprised of two (2) pieces, an outer piece 54 and an inner piece 56, joined together to make a single bushing 46, it should be understood that the bushing 46 could be made as a single piece component. Thus, the descriptions in this application encompass both a two (2) piece and a single piece bushing 46. The A and B designations have been added to the numbers to indicate similar components of the inner 56 and outer 54 pieces of the bushing 46, respectively. For example, the bearing surface 48 represents the exterior surface of the bushing 46 which slidably engages the opposing surface 50 for rotatably supporting the axle assembly 10 on the vehicle 30. In the preferred embodiment, this bearing surface 48 is comprised of two components, an inner piece 56 and an outer piece 54, each of which has its own bearing surface 48A and 48B respectively.

In the preferred embodiment, the outer 54 and inner 56 pieces of the bushing 46 are of frustroconical shape, however, it should be understood that other shapes can be used. When outer 54 and inner 56 pieces of frustroconical shape are used, it is preferred that the pieces 54, 56 be assembled such that the faces with the smaller cross sectional areas are mated together, resulting in symmetrical disposition about the central bushing axis 52.

The outer piece 54 includes first 58 and second 60 faces and the inner piece 56 includes first 62 and second 64 faces. The first faces 58, 62 of the outer 54 and inner 56 pieces are of larger cross sectional area than the second faces 60, 64. The first face 62 of the inner piece 56 engages the axle housing 26 and the second face 60 of the outer piece 54 engages the second face 64 of the inner piece 56. Shims 66 can be placed between the outer 54 and inner 56 pieces for adjusting end play resulting from clearances between the outer 54 and inner 56 pieces.

The axle housing 26 includes a circumferential extension 68 which engages a mating circumferentially disposed lip 70 on the inner piece 56. This extension 68 locates the inner piece 56 with respect to the axle housing 26 and ensures that the bushing 46 is properly assembled onto the axle assembly 10. Fasteners 72 (only one is shown) hold the outer 54 and inner 56 pieces together and attach the bushing 46 to the axle assembly 10. In the preferred embodiment bolts are used, however, any suitable fasteners known in the art can be used. Also, other joining methods such as welding or using adhesives could be used to hold the outer 54 and inner 56 pieces together.

The outer 54 and inner 56 pieces also include hollow center portions 74 disposed about the longitudinal axis 34. These hollow center portions 74 help reduce the weight of the axle assembly 10.

Figure 3:
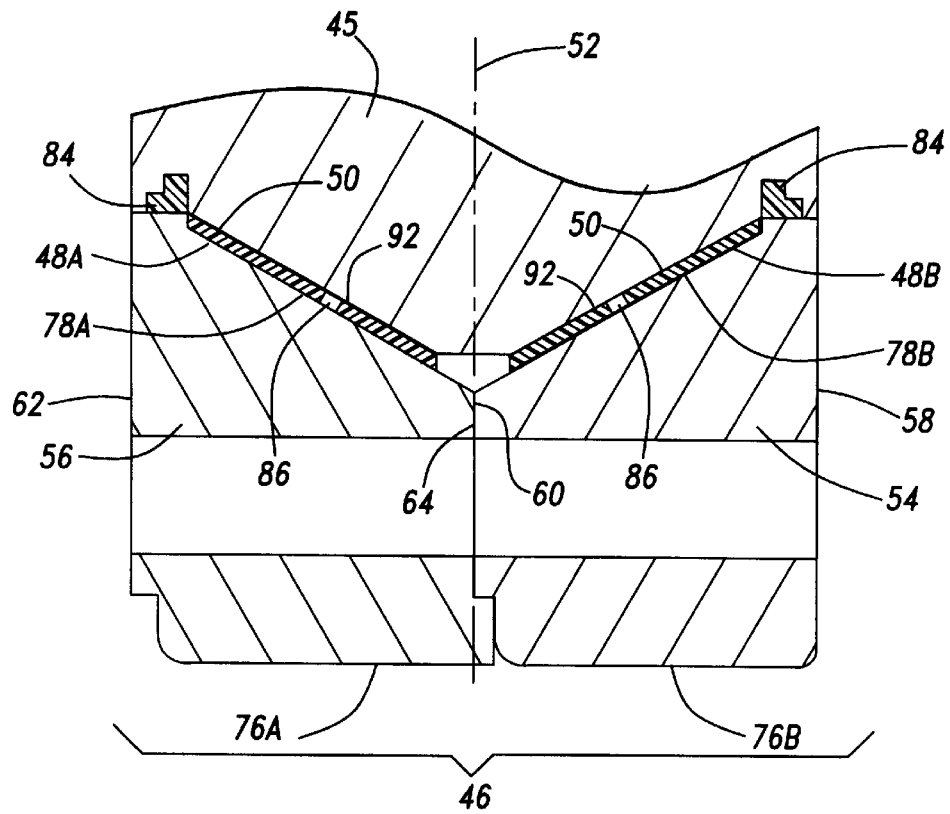
FIG. 3 is an enlarged view of the subject invention enclosed in circle 3 of FIG. 2.

As shown in FIG. 3, the bushing 46 includes an interior surface 76 (76A and 76B) and an exterior surface 78 (78A and 78B), with the bearing surface 48 (48A and 48B) of the bushing 46 being located on the exterior surface 78 (78A and 78B). As previously mentioned, the bushing 46 of the preferred embodiment is comprised of two pieces joined together to make a single bushing 46, but could be made as a single piece component. The A and B designations have been added to the numbers to indicate similar components of the inner 56 and outer 54 pieces of the bushing 46, respectively.

Seals 84 are located between the exterior surface 78A, 78B of the bushing 46 and the opposing bearing surface 50. The seals 84 surround the outer 54 and inner 56 pieces of the bushing 46 and protect the bushing's bearing surface 48A, 48B from contaminants. In the preferred embodiment, the outer 54 and inner 56 pieces are formed from steel and include a nylon coating 92 on their exterior surfaces 78A, 78B. It should be understood that other materials can be used to make the outer 54 and inner 56 pieces and any bushing material known in the art can be used as the coating.

Figure 4:
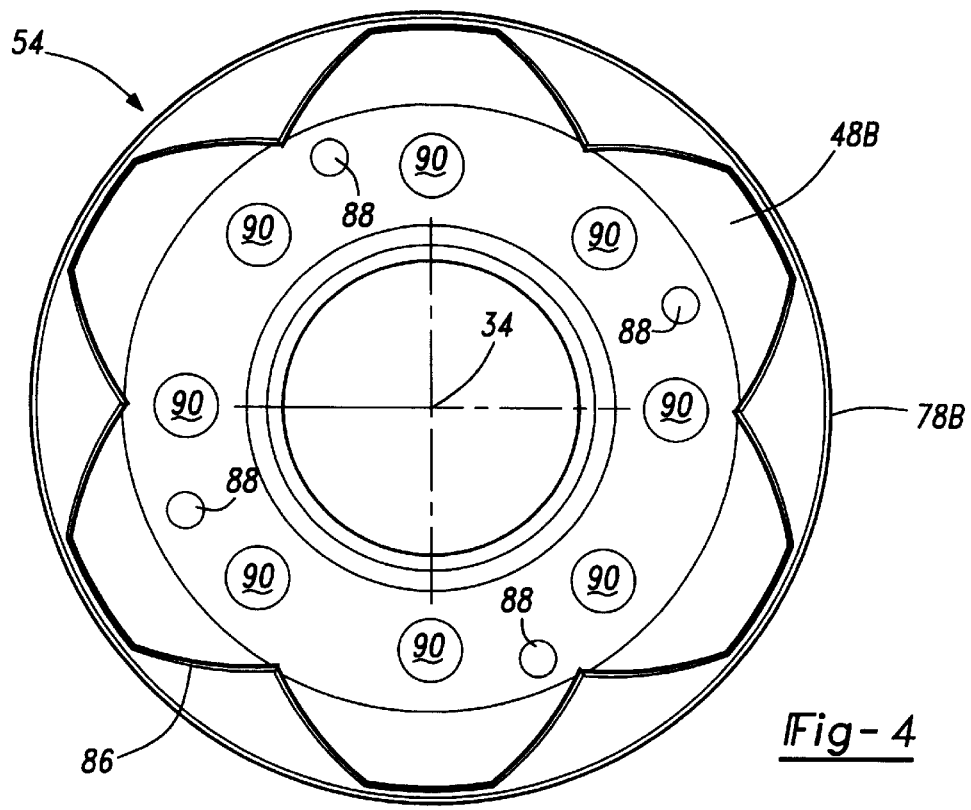
FIG. 4 is a front view of the subject invention.

The outer piece 54 of the bushing 46 is shown in FIG. 4. The inner piece 56 is preferably of similar design and any descriptions applying to the outer piece 54 should be understood to also apply to the inner piece 56. The outer piece 54 includes grooves 86 for receiving lubricant on its exterior surface 78B. The grooves 86 are located such that the lubricant can be easily applied, thus providing easy maintenance. The outer 54 and inner 56 pieces include four (4) fastening holes 88 disposed radially around the longitudinal axis 34. These four fastening holes 88 are used for pre-assembly of the outer 54 and inner 56 pieces. The appropriate number of shims 66 are sandwiched between the outer 54 and inner 56 pieces and four bolts (not shown) are inserted into the four fastening holes 88 so that the pieces 54, 56 are firmly held together. This pre-assembly of the bushing 46 allows the correct preload to be set.

The outer 54 and inner 56 pieces also include eight (8) bolt holes 90 for assembling the bushing 46 onto the axle housing 26. These holes 90 are also disposed radially around the longitudinal axis 34. Once the outer 54 and inner 56 pieces of the bushing 46 are assembled, the bushing 46 is placed against the axle housing 26 and eight (8) bolts (not shown) are inserted into the holes 90 so that the bushing 46 is securely fastened to the axle housing 26.

While a drive axle assembly 10 has been described in this application, it should be understood that the inventive trunnion mount 32 with the V-shaped bushing 46 could be used on a non-drive axle. Also, while the bushing has been referred to as "V-shaped" throughout this application, it should be understood that the bushing is not limited to a specific V-shape where two straight-line surfaces intersect at a common point. That is, within the definition of V-shaped the surfaces themselves could be curved or otherwise non-linear or the two surfaces could terminate at a curved apex.

A preferred embodiment of this invention has been disclosed, however, a worker of ordinary skill in the art would recognize that certain modifications come within the scope of this invention. For that reason, the following claims should be studied to determine the true scope and content of this invention.

I claim:

1. An axle assembly for a vehicle having a longitudinal axis comprising:

an axle housing extending along a central axis to be disposed transversely to the longitudinal axis of a vehicle and including first and second mounts disposed on longitudinally opposite sides of said central axis for supporting said axle housing on a vehicle, said second mount including a bushing having a central bushing axis and presenting a bearing surface for sliding engagement with an opposing bearing surface such that said axle housing pivots on said bushing about the longitudinal axis, said bearing surface being disposed at an angular relationship relative to said central bushing axis for reacting to both axial and radial forces.

2. An axle assembly as set forth in claim 1 wherein said bearing surface is comprised of two surfaces, said surfaces originating at an apex on said central bushing axis and extending radially outwardly from opposite sides of said central bushing axis forming a V.

3. An axle assembly as set forth in claim 1 wherein said bushing includes an outer piece and an inner piece disposed on opposite sides of said central bushing axis.

4. An axle assembly as set forth in claim 3 wherein said outer and inner pieces are generally frustroconical.

5. An axle assembly as set forth in claim 4 wherein said outer and inner pieces are symmetrically disposed about said central bushing axis.

6. An axle assembly as set forth in claim 3 wherein said outer piece is connected to said inner piece by at least one fastener.

7. An axle assembly as set forth in claim 3 wherein said outer and inner pieces include hollow center portions for reducing the weight of said axle assembly.

8. An axle assembly as set forth in claim 1 wherein said bushing includes grooves for receiving lubricant.

9. An axle assembly as set forth in claim 1 wherein said first mount is supported by a bearing cage, said first mount reacting only to radial forces.

10. An axle assembly for a vehicle having a longitudinal axis comprising:

an axle housing extending along a central axis to be disposed transversely to the longitudinal axis of a vehicle and including first and second mounts disposed on longitudinally opposite sides of said central axis for supporting said axle housing on a vehicle, said second mount including a bushing having a central bushing axis and presenting a bearing surface for sliding engagement with an opposing bearing surface, said bearing surface being disposed at an angular relationship relative to said central bushing axis for reacting to both axial and radial forces and wherein said bushing includes an outer piece and an inner piece disposed on opposite sides of said central bushing axis, said axle housing including an extension which engages a circumferentially disposed lip of said inner piece for locating said inner piece with respect to said axle housing.

11. A trunnion mount comprising:

a first member having a longitudinal axis;

a second member extending along a central axis to be disposed transversely to said longitudinal axis of said first member;

a first interface depending from said first member;

a second interface depending from said first member and spaced apart from said first interface;

a first mount supported by said second member for engaging said first interface; and a second mount supported by said second member longitudinally opposite from said first mount for engaging said second interface, said first and second mounts for allowing pivotal movement of said second member about said longitudinal axis and wherein said second mount includes a bushing having a central bushing axis and presenting an exterior bearing surface for sliding engagement with an opposing bearing surface of said second interface, said bearing surface being disposed at an angular relationship relative to said central bushing axis.

12. A trunnion mount as set forth in claim 11 wherein said exterior bearing surface is comprised of two surfaces, said surfaces originating at an apex on said central bushing axis and extending radially outwardly from opposite sides of said central bushing axis forming a V.

13. A trunnion mount as set forth in claim 11 wherein said bushing includes an outer piece and an inner piece disposed on opposite sides of said central bushing axis, said inner piece having a bearing surface and said outer piece having bearing surface wherein said bearing surfaces of said inner and outer pieces together form said exterior bearing surface of said bushing.

14. A trunnion mount as set forth in claim 13 wherein said bearing surfaces of said outer and inner pieces include grooves for receiving lubricant.

15. A trunnion mount as set forth in claim 13 wherein said inner and outer pieces are joined together by at least one fastener.

16. A bushing rotatably supporting an axle on a vehicle mounting member comprising:

a mounting member defining a longitudinal axis and presenting an interior bearing surface;

a first piece and a second piece supported on the axle and disposed on opposite sides of a central bushing axis oriented generally perpendicular to said longitudinal axis, said first piece including a first exterior bearing surface and said second piece including a second exterior bearing surface wherein said first and second exterior bearing surfaces originate at an apex located on said central bushing axis and extend radially outwardly from opposite sides of said central bushing axis forming a V, said first and second exterior bearing surfaces engaging said interior bearing surface to provide pivotal support about said longitudinal axis.

17. A bushing as set forth in claim 16 wherein said first and second exterior bearing surfaces of said first and second pieces include grooves for receiving lubricant.

18. A bushing as set forth in claim 16 including at least one shim placed between said first and second pieces for adjusting end play.

19. A bushing as set forth in claim 16 wherein said first and second pieces are formed from steel and said first and second bearing surfaces are coated with nylon.

20. A bushing as set forth in claim 16 wherein said first and second pieces are held together by at least one fastener.

* * * * *